United States Patent
Janjua et al.

(10) Patent No.: US 10,218,515 B2
(45) Date of Patent: Feb. 26, 2019

(54) EVOLVING A SIGNATURE DURING TRUST VERIFICATION OF AN OBJECT

(71) Applicant: Microsoft Technology Licensing, LLC, Redmond, WA (US)

(72) Inventors: Muhammad Umar Janjua, Bellevue, WA (US); Mihail Frintu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 120 days.

(21) Appl. No.: 15/249,180

(22) Filed: Aug. 26, 2016

(65) Prior Publication Data

US 2018/0062859 A1    Mar. 1, 2018

(51) Int. Cl.
*H04L 29/06* (2006.01)
*H04L 9/32* (2006.01)
*H04L 9/06* (2006.01)

(52) U.S. Cl.
CPC .......... *H04L 9/3268* (2013.01); *H04L 9/0643* (2013.01); *H04L 9/3236* (2013.01); *H04L 9/3247* (2013.01)

(58) Field of Classification Search
CPC ... H04L 9/3294; H04L 63/0823; H04L 63/08; H04L 63/083
See application file for complete search history.

(56) References Cited

U.S. PATENT DOCUMENTS

| 5,432,852 | A |   | 7/1995 | Leighton et al. |
| 5,604,800 | A | * | 2/1997 | Johnson ................. G06F 21/34 38/23 |
| 5,754,659 | A |   | 5/1998 | Sprunk et al. |
| 5,809,145 | A | * | 9/1998 | Slik ........................ G06F 21/10 705/52 |

(Continued)

FOREIGN PATENT DOCUMENTS

EP    0781003 A2    6/1997

OTHER PUBLICATIONS

Gauri R. Thorat, A Novel Approach for Efficient User Revocation with Maintaining Shared Data Integrity on Cloud, Jun. 2015.*

(Continued)

*Primary Examiner* — Ali S Abyaneh
(74) *Attorney, Agent, or Firm* — Jacob P. Rohwer; Newport IP, LLC

(57) ABSTRACT

The techniques described herein dynamically determine a new signature that is valid and that can be used to verify trust of an object (e.g., a certificate, an executable file, user credentials, etc.). The dynamic determination of the new signature is implemented by an entity performing a trust verification process. The entity can execute a single unified service to establish trust in the object. The dynamic determination, or the ability for an invalid signature to evolve into a newer version that can be trusted, is implemented in response to an invalidity event indicating that the initial signature is no longer valid for trust verification purposes. Example invalidity events can comprise the expiration of a (Continued)

time sensitive signature attribute (e.g., an expired private key), a recently discovered weakness associated with an individual signature attribute (e.g., a key of insufficient length), or a determination that a certificate authority can no longer be trusted.

17 Claims, 4 Drawing Sheets

(56) References Cited

U.S. PATENT DOCUMENTS

| | | | |
|---|---|---|---|
| 6,584,565 B1 | 6/2003 | Zamek | |
| 6,978,017 B2 | 12/2005 | Wiener et al. | |
| 7,574,605 B2 | 8/2009 | Tanimoto et al. | |
| 8,250,631 B2 | 8/2012 | Iyengar et al. | |
| 9,032,212 B1 | 5/2015 | Juels | |
| 2001/0002485 A1 | 5/2001 | Bisbee et al. | |
| 2003/0126429 A1* | 7/2003 | Jinmei | H04L 63/20 713/153 |
| 2004/0179684 A1* | 9/2004 | Appenzeller | H04L 9/0825 380/44 |
| 2005/0257058 A1* | 11/2005 | Yoshida | H04L 29/06 713/175 |
| 2007/0088957 A1 | 4/2007 | Carson | |
| 2007/0220259 A1 | 9/2007 | Pavlicic | |
| 2007/0277038 A1 | 11/2007 | Hardy et al. | |
| 2008/0159527 A1 | 7/2008 | Bentley et al. | |
| 2010/0020964 A1* | 1/2010 | Horie | G06F 7/725 380/44 |
| 2010/0100743 A1 | 4/2010 | Ali | |
| 2010/0275026 A1* | 10/2010 | McLean | G06F 21/12 713/176 |
| 2011/0083189 A1* | 4/2011 | Kravitz | G06F 21/10 726/26 |
| 2011/0126001 A1* | 5/2011 | Fu | H04L 63/06 713/156 |
| 2015/0280923 A1 | 10/2015 | Camenisch et al. | |

OTHER PUBLICATIONS

"International Search Report and Written Opinion Issued in PCT Application No. PCT/US2017/047248", dated Nov. 10, 2017, 12 Pages.

Thorat, et al., "A Novel Approach for Efficient User Revocation with Maintaining Shared Data Integrity on Cloud", In International Journal on Recent and Innovation Trends in Computing and Communication, vol. 3, Issue 6, Jun. 1, 2015, pp. 4085-4089.

Wu, "Self-Generated-Certificate Digital Signature", In Proceedings of Fourth International Conference on Genetic and Evolutionary Computing, Dec. 13, 2010, pp. 379-382, 4 pages.

* cited by examiner

EVOLVING A SIGNATURE DURING TRUST VERIFICATION OF AN OBJECT

BACKGROUND

A cryptographic signature can be used to verify the trust of an object such as a certificate (e.g., of a Secure Sockets Layer (SSL) site), an executable file, or user credentials. A cryptographic signature is typically static, and therefore, unchangeable. Consequently, if a determination is made that the cryptographic signature is no longer valid (e.g., the cryptographic signature is revoked, expired, and/or includes a weakness such as a broken algorithm or an insufficient key length), the process being implemented to verify the trust of the object using the cryptographic signature fails (e.g., is unable to be successfully completed). As a result, entities that create and/or submit the cryptographic signature to a trust verification entity in accordance with a trust verification request of an object are notified of the failed trust verification process and are subsequently tasked with additional work to create a new cryptographic signature that can be re-submitted and used to verify the trust of the object via a subsequent trust verification process. This additional work due to the inability of the trust verification entity to complete the initial trust verification process due to an invalid cryptographic signature typically requires human intervention and/or often delays requested device and/or network functionality, which can frustrate a user experience, for example.

SUMMARY

The techniques described herein dynamically determine a new signature that is valid and that can be used to verify trust of an object (e.g., a certificate, an executable file, user credentials, etc.). The dynamic determination of the new signature is implemented by an entity performing a trust verification process. The entity can execute a single unified service to establish trust in the object. The dynamic determination, or the ability for an invalid signature to evolve into a newer version that can be trusted, is implemented in response to an invalidity event indicating that the initial signature is no longer valid for trust verification purposes. Example invalidity events can comprise the expiration of a time sensitive signature attribute (e.g., an expired private key), a recently discovered weakness associated with an individual signature attribute (e.g., a key of insufficient length), or a determination that a certificate authority can no longer be trusted.

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
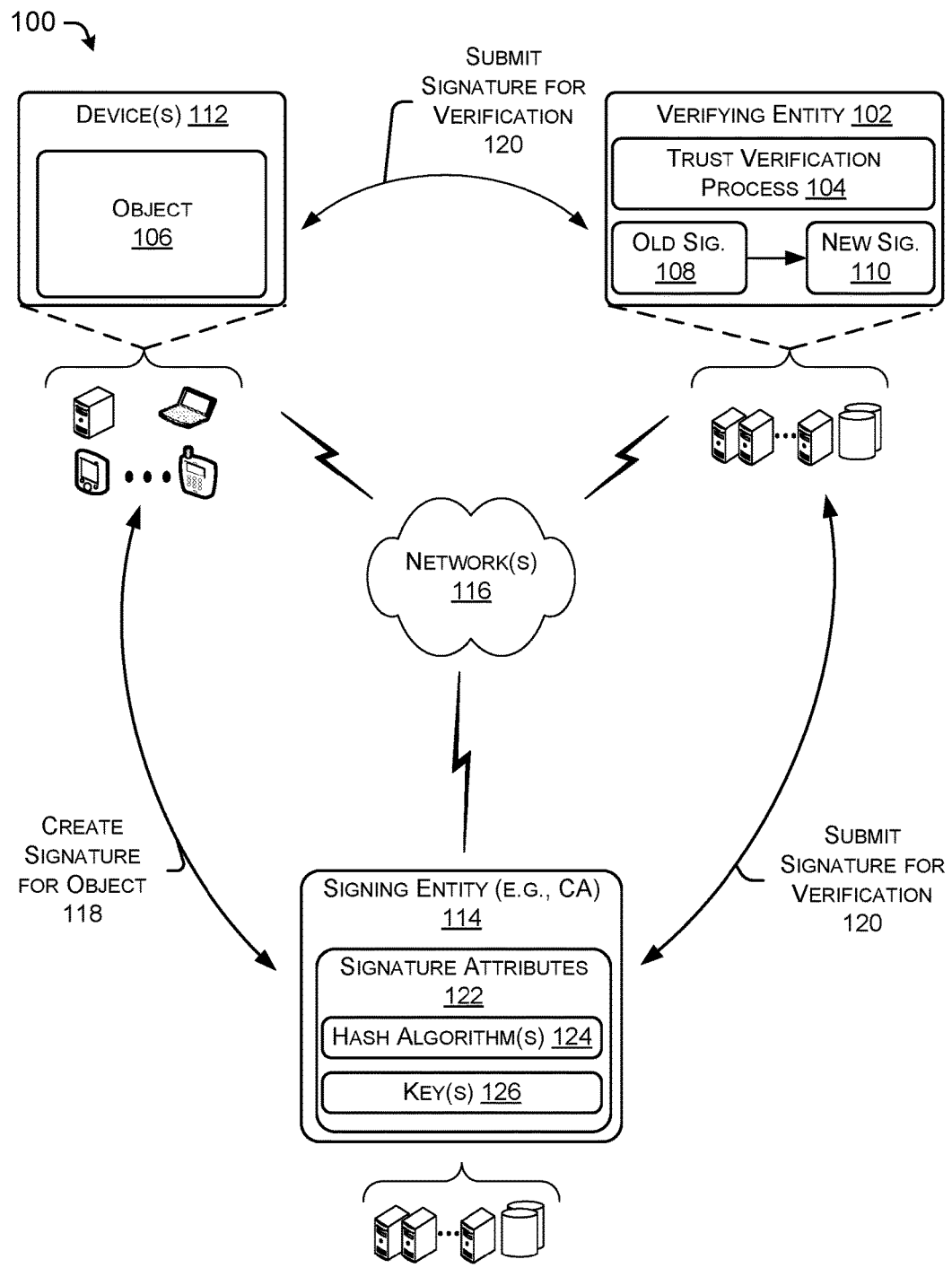
FIG. 1 illustrates an example environment in which a verifying entity implementing a trust verification process of an object can dynamically update an old signature that is no longer valid into a new signature that is valid and that can be used to complete the trust verification process.

The present application describes dynamically determining a new cryptographic signature that is valid and that can be used to verify trust of an object. A cryptographic signature may be referred to herein as a "signature". The dynamic determination, or the ability for an invalid signature to evolve into a newer version that can be trusted, is implemented in response to an invalidity event indicating that the initial signature provided in association with a request to verify trust in an object is no longer valid. In various examples, the invalidity event may indicate that an individual signature attribute of the signature is not valid or can no longer be trusted, where multiple signature attributes can be used, or chained together in a process, to create a signature. Therefore, a signature that is no longer valid due to an invalid signature attribute, for example, may be referred to herein as an "old" signature or an "invalid" signature. In contrast, an updated (e.g., evolved) signature that is valid and that can be subsequently used to verify trust in an object may be referred to herein as a "new" signature or a "valid" signature.

As described below, the dynamic determination of the new signature is implemented by an entity performing a trust verification process. Such an entity may be referred to herein as a verifying entity or a verifier. A verifying entity can be configured and operated separately such that various external entities can submit, to the verifying entity, a request for the verifying entity to verify the trust of an object based on the signature. Stated another way, the verifying entity can execute a single unified service called upon to establish trust in an object. Example external entities that query the verifying entity about the trust of an object can include, but are not limited to, an entity involved in creating or hosting the object and/or an entity involved in creating the signature for the object.

Conventionally, if a signature associated with an object is no longer valid, the trust verification process of the object fails and the verifying entity is unable to successfully verify the trust of the object. Rather, the verifying entity merely informs an entity that requests the trust verification of the invalidity of the signature (e.g., the signature can no longer be trusted). Consequently, the initially requested trust verification process is interrupted and the entities involved in creating/hosting the object and/or creating the signature for the object are tasked with creating and re-submitting a new signature that is valid and that can be used to verify the trust of the object. As a result, another iteration of the trust verification process must be requested and completed at a later time. This subsequent iteration creates overhead and additional work for such entities (e.g., clients of the trust verification service), which leads to excessive resource consumption and delays for such entities.

Using the techniques described herein, an old signature that is no longer valid can automatically be updated to a new signature that is valid during implementation of a trust verification process. Accordingly, the initially implemented trust verification process does not have to fail, but rather, can continue uninterrupted (e.g., without having to notify the aforementioned external entities of a failed process due to an invalid signature).

Moreover, the process that updates and evolves an old signature into a new signature can be repeated as needed (e.g., an evolution path of a signature from "old" to "new1" to "new2" to "newN" can be created, where N is a positive integer number). This evolution path can be evaluated, tracked, audited, and/or debugged as issues arise with a signature and/or an associated object. Such an evolution path also eliminates a need to hardcode or prepack multiple signatures at one time for one object, and therefore, can reduce a size of an encoded signature file. For instance, a conventional dual signature approach hardcodes two signatures within an object and if the first signature can no longer be used, the second signature can be used. The techniques described herein avoid the need to hardcode a new signature or a new signature's attribute which is needed for the future use in case of an invalidity event (e.g., failed trust). That is, the dynamic determination of a new signature is more resilient to the invalidity event compared to the conventional hardcoded approach (e.g., dual signature approach).

As used herein, an entity comprises one or more of an organization, person(s), device(s) (e.g., a server), or site(s) (e.g., a Web site) configured to perform some sort of functionality. For instance, a "signee" entity can be a device that creates or hosts the object to be signed (e.g., a hash of an object such as an executable file). In another example, a "signing" entity can comprise a certificate authority (CA) (e.g., a server) that uses a private key to create a signature associated with an object. As described above and amongst other things, an object can comprise a certificate (e.g., of a Secure Sockets Layer (SSL) site), an executable file, or user credentials. In various implementations, the private key is used to sign (e.g., encrypt, encode, etc.) a hash of an object to create the signature. The signature can be embedded into the object and/or stored in a database (e.g., a signature catalog) so that the signature can be accessed (e.g., submitted, presented, etc.) and used by a verifying entity to verify trust of the object. For instance, the verifying entity can use a public key to determine whether the signature is valid and acceptable.

The techniques described herein are able to dynamically determine a new signature that is valid and that is useable to verify trust of an object without having to abandon the initial trust verification process. The dynamic determination of the new signature is implemented in response to a determination that the signature originally submitted or presented for trust verification is no longer valid, and the dynamic determination can be repeated a number of times over a period of time. As described below, this determination can be based on a verifying entity discovering, or being made aware of, an invalidity event. Thus, in accordance with the examples described herein, the verifying entity implementing the trust verification process can evolve or refresh an old signature so the trust verification process can be successfully completed (e.g., trust of the object can be verified) using a new signature rather than being halted or interrupted due to the compromised validity of the old signature.

An invalidity event associated with a signature can be associated with an individual signature attribute. For instance, an invalidity event can comprise an expiration of a time sensitive signature attribute (e.g., a private key) used by a signing entity to create the signature. An invalidity event can alternatively or additionally comprise a recent determination of a previously unknown weakness in the signature. For example, a weakness can be related to an insufficient key size or key length (e.g., the key is not long enough or the key is made up of a number of bits that does not meet or exceed a minimum threshold number of bits). In another example, a weakness can be related to a compromised or broken signature algorithm (e.g., Security Hash Algorithm-1 (SHA1) is broken and Security Hash Algorithm-2 (SHA2) should be used instead). Moreover, an invalidity event associated with a signature can alternatively or additionally comprise a determination that a signing entity (e.g., a certificate authority) that creates the signature is no longer a trusted signing entity. In some instances, these invalidity events can be associated with a cryptographic attack such as hash collision, signature fabrication, and/or fraudulent signature issuance. Consequently, the techniques described herein can use an invalidity event to urgently revoke a signature thereby rendering the signature invalid and useless with respect to a trust verification process of an object (e.g., the signature can no longer be relied upon for trust verification purposes).

FIG. 1 illustrates an example environment 100 in which a verifying entity 102 implementing a trust verification process 104 of an object 106 can dynamically update an old signature 108, that is no longer valid, into a new signature 110 that is valid and that can be used to complete the trust verification process. As described above, the object 106 can be created and/or hosted by one or more devices 112 (referred to herein as a device 112). Moreover, the object 106 is signed by a signing entity 114 to create a signature (e.g., the old signature 108) for the object. In at least one example, the signing entity 114 can be a certificate authority (CA). Accordingly, the device 112 and/or the signing entity 114 can interact over network(s) 116 to create the signature for the object 106, as referenced by 118. In some instances, the device 112 and the signing entity 114 can be the same (e.g., same entity and/or same device).

Once the signature is created, the device 112 and/or the signing entity 114 submit, to the verifying entity 102, the signature for trust verification, as referenced by 120. In one implementation, the signature can be embedded into the object 106 such that the object 106, along with the embedded signature, can be submitted, for trust verification. Alternatively, the signature can be associated with the object 106, yet stored separately (e.g., in a signature catalog database). In this alternative implementation, the device 112 and/or the signing entity 114 can submit a request for trust verification that identifies the object 106, and the verifying entity 102, based on the identification of the object 106, can subsequently locate and access the separately stored signature and use the signature to verify the trust of the object 106.

A device (e.g., device 112) can comprise any computing device configured with processing and/or memory resources that can connect to a network 116. Thus, the device can be a server, a storage device, a tablet computer, a laptop, a desktop computer, a gaming console, a media player, a mobile phone (e.g., a smart phone), a handheld computer, a wearable device, a smart appliance, networking equipment (e.g., a router device, a firewall device, etc.), a kiosk, a printer, a camera, a sensing device, and so forth. The signing entity 114 and the verifying entity 102 are also comprised of one or more devices configured with processing and/or memory resources that can connect to a network 116. Such devices are typically servers, but can also comprise one or more other example devices listed above. The devices described herein can access the network(s) 116 utilizing any one of various wired or wireless communications technologies. Thus, a network 116 can be any of various wireless networks including but not limited to: (i) any of various IEEE 802.11 Wireless local area network (LAN) compliant networks that use, for example, 802.11g Wi-Fi network connectivity, 802.11ac Wi-Fi network connectivity, etc., (ii) mobile communications networks such as Global System for Mobile Communications (GSM) networks, Universal Mobile Telecommunications System (UMTS) networks, Long-Term Evolution (LTE) networks, etc., or (iii) any of various satellite communication networks that use, for example, microwave radio frequencies such as Super High Frequency (SHF), Ultra High Frequency (UHF), etc. A network 116 can also or alternatively include any one of various personal area networks including but not limited to IEEE 802.15, Bluetooth®, and so forth. A network 116 can also or alternatively include wired connections, including but not limited to Ethernet networks, such as those defined by IEEE 802.3, fiber-optic networks, and so forth. A network 116 can provide access to the public Internet or to other wide area networks (WANs), to campus area networks (CANs), to metropolitan area networks (MANs), to LANs, to data center networks (DCNs), and so forth.

As described above, the signing entity 114 is configured to create, or at least help create, a signature for the object 106. Accordingly, the signing entity 114 can include various signature attributes 122 useable to create the signature. In one example, a signature attribute 122 can comprise a hash algorithm 124, which can be an algorithm that converts data (e.g., of the object 106) to a bit string of a fixed size using a one-way function. Applying a hash algorithm 124 to the data of the object can produce a hash of the object, or a "signee hash". In another example, a signature attribute 122 can comprise a key 126, that includes a private portion (e.g., the private key) and a corresponding public portion (e.g., the public key). The signing entity 114 uses the private key to sign (e.g., encrypt, encode, etc.) the hash of an object to create the signature associated with the object 106. Moreover, the corresponding public key is distributed to other entities such as the verifying entity 102 so that the verifying entity 102 can use the corresponding public key to determine whether the signature is valid and acceptable. Other entities and devices may also be involved in creating the signature, and therefore, can also include signature attributes (e.g., including a hash algorithm 124 and/or a key 126).

Consequently, the signing entity 114 is configured to participate in a chained process that creates a signature associated with the object 106. However, as described above, an invalidity event may describe a reason for revoking the signature so that it is no longer valid and can no longer be relied upon for trust verification purposes. Accordingly, when the invalid signature (e.g., the old signature 108) is presented or accessed in association with a trust verification process 104 for the object 106, the verifying entity 102 is unable to verify the trust of the object 106 due to the invalid signature. Typically, the trust verification process 104 fails and is abandoned due to the old signature 108. However, in accordance with the techniques provided herein, the verifying entity 102 is configured to evolve the old signature 108 into a new signature 110 that is valid and that can be used to successfully verify the trust of the object 106.

In various examples, the reason for an invalid signature is due to a particular signature attribute that is no longer valid (e.g., an expired private key, insufficient key length, an untrusted certificate authority, etc.). The reason can be determined via information included in an invalidity event. Therefore, the verifying entity 102 is configured to decode the old signature 108 so the signature attributes used to create the old signature 108 can be separately identified. Once decoded, the verifying entity 102 can use a valid signature attribute (e.g., the signee hash which has not been compromised) to discover and/or identify a new signature attribute (e.g., a new private key, a new key with sufficient length, a new certificate authority that can be trusted, etc.) that is valid and that can be used to create the new signature 110 (e.g., the new signature attribute is relied upon for trust verification instead of the old signature attribute that is no longer valid or accepted).

Figure 2:
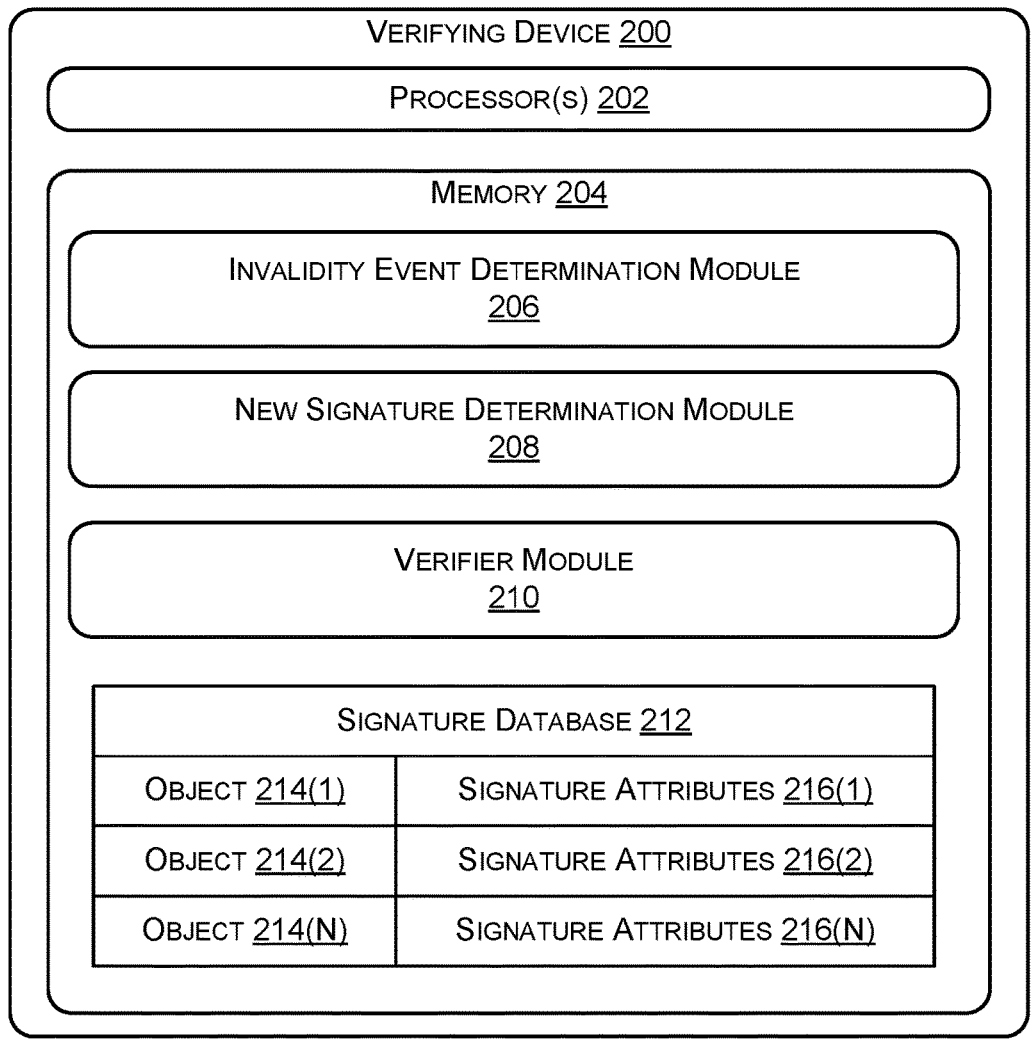
FIG. 2 illustrates a block diagram that illustrates an example verifying device that can dynamically update an old signature that is no longer valid into a new signature that is valid and that can be used to complete the trust verification process.

FIG. 2 illustrates a block diagram of further example components of a verifying device 200, which can be part of the verifying entity 102. The verifying device 200 can include one or more processor(s) 202 and memory 204, examples of which are described below. The verifying device 200 further includes an invalidity event determination module 206, a new signature determination module 208, a verifier module 210, and a signature database 212, each of which is further described herein. As used herein, the term "module" is intended to represent example divisions of executable instructions for purposes of discussion, and is not intended to represent any type of requirement or required method, manner or organization. Accordingly, while various "modules" are described, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules can be implemented in whole or in part by hardware (e.g., a specialized processing unit, etc.) to execute the described functions.

As described above, the verifying entity 102, and by association the verifying device 200, is tasked with verifying the trust of an object 106 (e.g., upon a request submitted by the device 112). To do so, the verifying device 200 determines whether a signature associated with the object 106 is valid. Accordingly, the signature database 212 of the verifying device 200 can store information associated with various objects 214(1) . . . 214(N) which may require trust verification (e.g., objects known to a trust verification service). The information can comprise object identifiers and also at least some of the signatures attributes 216(1) . . . 216(N) associated with creation of the signature (e.g., public keys, identifications of trusted signing entities used to create the signature, etc.). The signature attributes 216(1) . . . 216(N) respectively associated with the objects 214(1) . . . 214(N). When the verifying device 200 receives a request to verify trust in a particular object (e.g., object 106), the verifying device 200 can use information in the request to locate corresponding signature attributes stored in association with the particular object for which the trust is to be verified.

In some instances, the signature associated with the object that is initially presented, submitted, or accessed, is no longer valid. The invalidity event determination module 206 is configured to determine that the signature associated with the object is no longer valid. For instance, an external entity such as the signing entity 114 can notify the invalidity event determination module 206 that an invalidity event exists or has occurred. Or, the invalidity event determination module 206 can find an invalidity issue in the signature, and therefore, can itself discover an invalidity event.

As described above, an invalidity event associated with a signature can comprise an expiration of a time sensitive signature attribute (e.g., a private key) used by a signing entity 114 to create the signature. An invalidity event associated with a signature can alternatively or additionally comprise a recent determination of a previously unknown weakness in the signature. For example, a weakness can be related to an insufficient key size or key length (e.g., the key is not long enough or the key is made up of a number of bits that does not meet or exceed a minimum threshold number of bits). In another example, a weakness can be related to a compromised or broken signature algorithm (e.g., Security Hash Algorithm-1 (SHA1) is broken and Security Hash Algorithm-2 (SHA2) should be used instead). Moreover, an invalidity event associated with a signature can alternatively or additionally comprise a determination that the signing entity 114 that creates the signature is no longer a trusted signing entity.

Upon determining that an invalidity event has occurred or exists, the new signature determination module 208 is configured to determine a new signature (e.g., new signature 110) associated with an object (e.g., object 106). In one implementation, a notification of an invalidity event received by the invalidity event determination module 206 can include a field with a self-contained new signature and/or new signature attribute that is valid and that can be used to verify trust of the object instead of the old signature or the old signature attribute that is no longer valid (e.g., an expired private key, a weak hash algorithm, etc.).

In another implementation, the new signature determination module 208 is configured to discover a new signature or a new signature attribute that is valid and that can be used to verify the trust of the object. For example, the new signature determination module 208 can search local and/or remote systems and/or databases that it trusts to discover new signature attributes that are valid and that can be used instead of the invalid signature attributes. To implement the search and to identify the new signature attributes, the new signature determination module 208 can use a signature attribute of the signature that is still valid and/or that has not been compromised (e.g., a valid signee hash). For instance, the new signature determination module 208 can find a new signature for an object by determining the new signature has the same valid signature attribute (e.g., the valid signee hash) as the old signature associated with the object. In some instances, the new signature determination module 208 ensures the new signature or the new signature attribute satisfies a particular set of characteristics (e.g., exceeds a minimum key size, uses a particular hash algorithm that is strong enough, etc.).

In yet another implementation, the new signature determination module 208 implement a process in which a new signature or a new signature attribute can be created. For example, the new signature determination module 208 can request that a trusted signature producing service and/or system create the new signature or the new signature attribute. Thus, the new signature determination module 208 can pass on, to the trusted signature producing service and/or system, a valid signature attribute of the old signature (e.g., the signee hash) with desired characteristics (e.g., a minimum key size, a particular hash algorithm that is strong, etc.). The trusted signature producing service and/or system can then create a completely new signature and return the new signature to the verifying entity.

Via the example implementations described above, once the new signature determination module 208 has determined the new signature, the verifier module 210 is configured to use the new signature to verify the trust of the object. Moreover, the verifier module 208 is configured to store the new signatures and/or the new signature attributes in the signature database 212 or in other signature databases so they can be re-used (e.g., by the verifying entity 102 or other verifying entities), at a future time, to verify trust in the object.

Accordingly, the techniques described herein in which a verifying entity is configured to evolve a signature without interrupting an initial trust verification process provides significant advantages over the conventional approach that uses static signatures that are unchangeable and that cause a trust verification process to fail or to be abandoned. For example, the techniques described herein provide the flexibility for the verifying entity to continue to evolve a signature each time an invalidity event associated with the signature occurs or exists. Moreover, the evolved signature is scalable such that it can be effectively and efficiently used for subsequent trust verification processes implemented in association with a same object (e.g., multiple client device may submit an invalid signature associated with a certificate of an SSL site).

Figure 3:
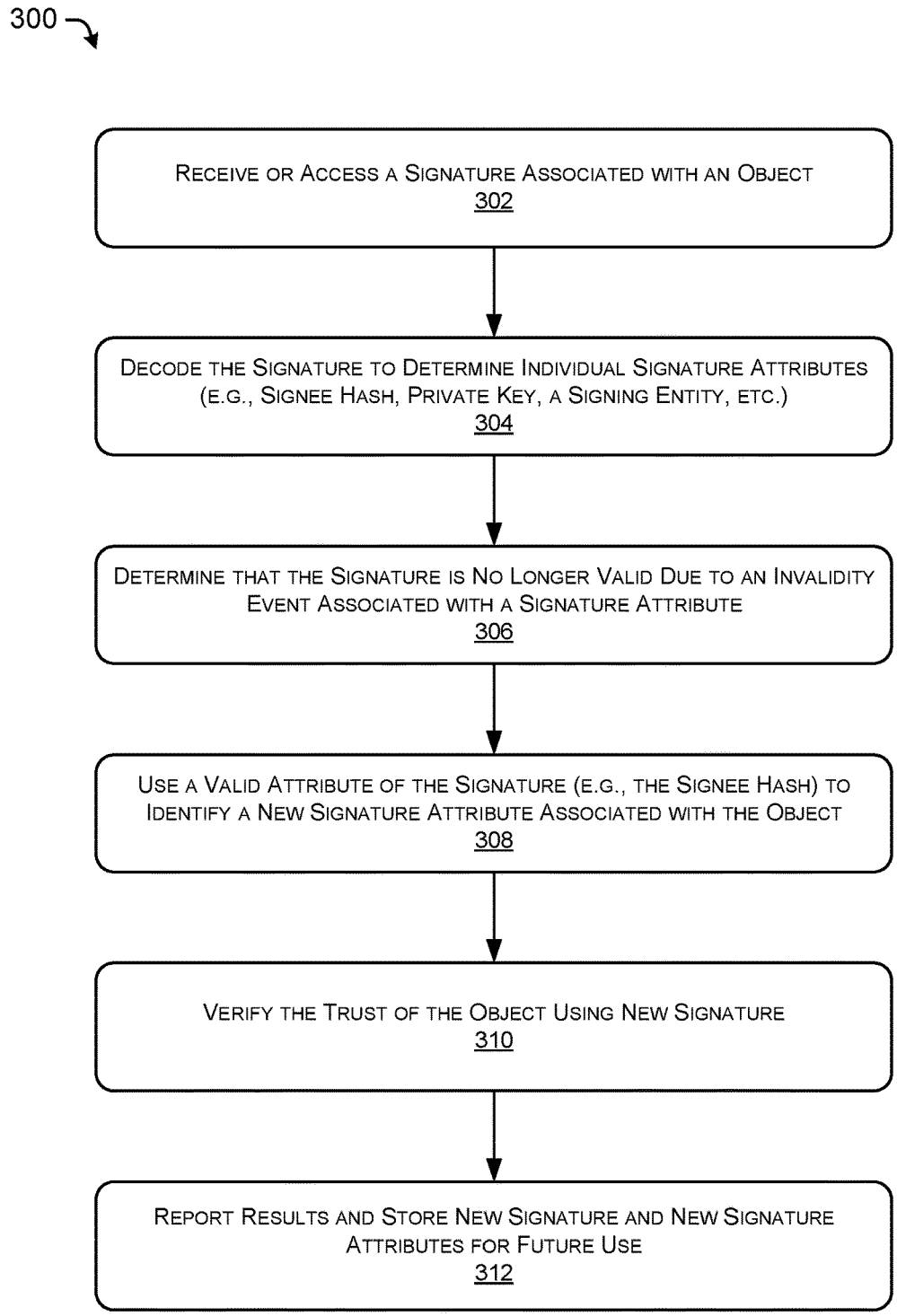
FIG. 3 illustrates a flow chart showing an example process, implemented by a verifying entity, for determining an invalidity event associated with a signature and for dynamically determining a new, evolved signature that is valid and that can be used to verify the trust of an object.
Figure 4:
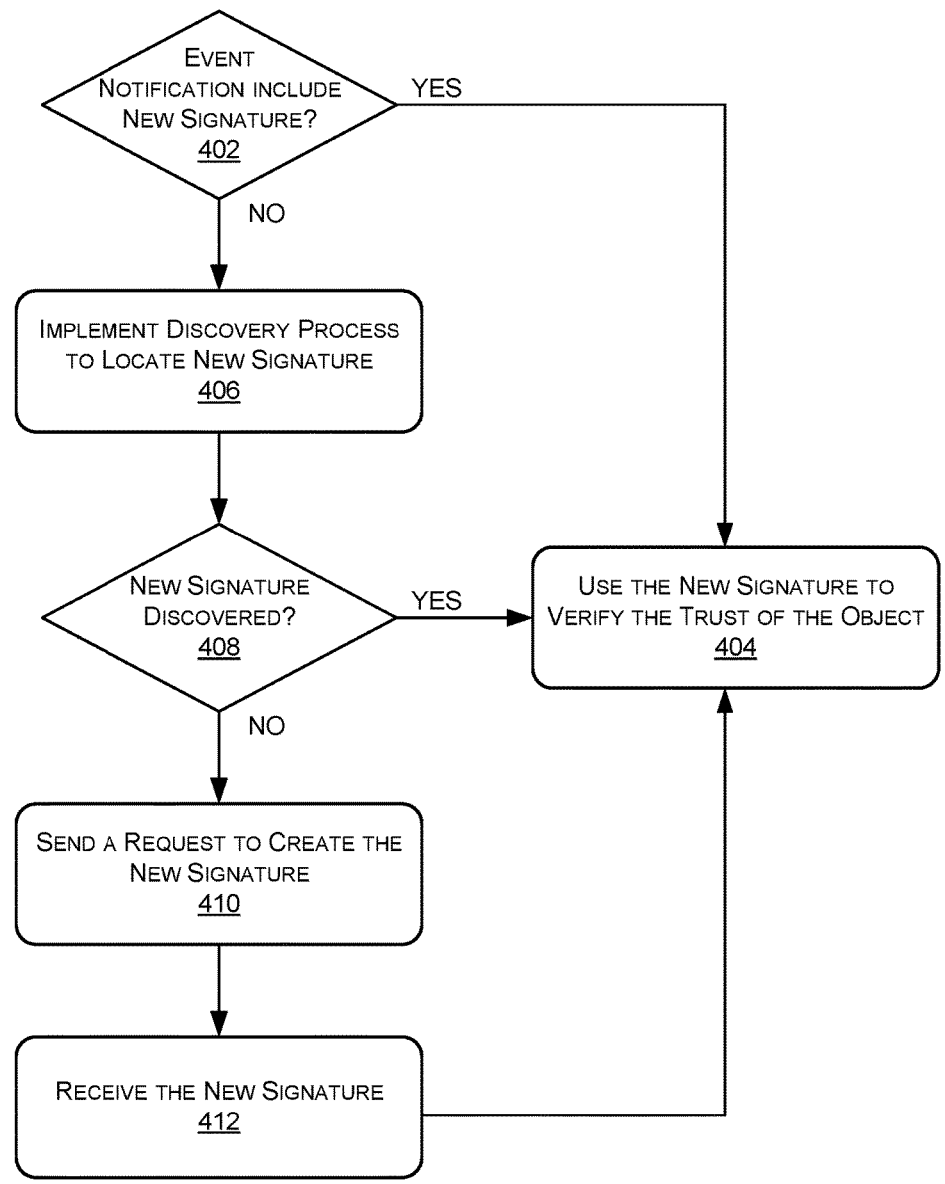
FIG. 4 illustrates a flow chart showing an example process, implemented by a verifying entity, for dynamically determining the new, evolved signature that is valid and that can be used to verify the trust of an object.

FIGS. 3 and 4 depict flow diagrams that show example processes in accordance with various examples. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the processes. Processes according to various examples of the present disclosure may include only some or all of the operations depicted in the logical flow graphs.

FIG. 3 illustrates a flow chart showing an example process 300, which can be implemented by the verifying entity 102 or other entities, for determining an invalidity event associated with a signature and for dynamically determining a new, evolved signature that is valid and that can be used to verify the trust of an object. In various examples, the process 300 can be repeated, multiple times for the same object, and as needed (e.g., to create a signature evolution path for the object).

At 302, a signature associated with an object is received or accessed. For example, a trust verification request that includes or in some way identifies the signature can be received by the verifying entity 102 from the device 112 or the signing entity 114.

At 304, the signature is decoded to determine individual signature attributes that are used to create the signature. For example, an individual signature attribute can include a hash of the object (e.g., the signee hash), a private key, a signing entity, and so forth.

At 306, it is determined that the signature received or accessed is no longer valid due to an invalidity event. In various examples, the invalidity event is associated with an individual signature attribute. Example invalidity events are described above, and the verifying entity 102 can be notified that an invalidity event has occurred or exists by an external entity (e.g., the signing entity 114). Alternatively, the invalidity event determination module 206 can itself determine that an invalidity event has occurred or exists based on its own examination of the signature.

At 308, a valid signature attribute is used to identify a new signature attribute associated with the object. For example, based on the decoding operation in 304, the new signature determination module 208 can identify individual signature attributes that are still valid (e.g., a valid signee hash), and therefore, are not the reason for the whole signature being invalid. Accordingly, the new signature determination module 208 can use a valid signature attribute to identify a new signature attribute, of the same type, that can be used instead of the invalid signature attribute, as described above and further discussed herein with respect to FIG. 4.

At 310, the trust of the object is verified using the new signature and/or the new signature attribute.

At 312, results of the trust verification process are reported to the entity that requested the trust verification. Moreover, the new signature and the new signature attribute can be stored for future use.

FIG. 4 illustrates a flow chart showing an example process 400, which can be implemented by the verifying entity 102 or other entities, for dynamically determining the new, evolved signature that is valid and that can be used to verify the trust of an object. In various example, the example process 400 can be implemented in association with operation 308 of the example process 300 of FIG. 3.

At decision 402, it is determined if the invalidity event notification (e.g., received from an external entity such as the signing entity 114) includes a new signature and/or a new signature attribute. If "yes", then the process proceeds to operation 404 and the new signature and/or the new signature attribute is used to verify the trust of the object.

If "no" at decision 402, the process proceeds to operation 406 and a discovery process to locate the new signature or the new signature attribute is implemented.

At decision 408, it is determined if the new signature or new signature attribute is discovered. If "yes", then the process proceeds to operation 404 and the new signature and/or the new signature attribute is used to verify the trust of the object.

If "no" at decision 408, the process proceeds to operation 410 and a request to create a new signature and/or a new signature attribute is sent to a trusted signature producing service and/or system.

At 412, the new signature and/or the new signature attribute is received from the trusted signature producing service and/or system. Subsequently, the process proceeds to operation 404 and the new signature and/or the new signature attribute is used to verify the trust of the object According to various non-limiting examples, the memory 204 is an example of computer-readable media. Computer-readable media stores computer-executable instructions that are loadable and executable by one or more processor(s) 202, as well as data generated during execution of, and/or usable in conjunction with, various programs.

Processor(s) 202 may include one or more single-core processing unit(s), multi-core processing unit(s), central processing units (CPUs), graphics processing units (GPUs), general-purpose graphics processing units (GPGPUs), or hardware logic components configured, e.g., via specialized programming from modules or application program interfaces (APIs), to perform functions described herein. In alternative examples, one or more functions of the present disclosure may be performed or executed by, and without limitation, hardware logic components including Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), Digital Signal Processing unit(s) (DSPs), and other types of customized processing unit(s). For example, a processing unit configured to perform one or more of the functions described herein may represent a hybrid device that includes a CPU core embedded in an FPGA fabric. These or other hardware logic components may operate independently or, in some instances, may be driven by a CPU. In some examples, the computing systems may include a plurality of processing units of multiple types. For example, the processing units may be a combination of one or more GPGPUs and one or more FPGAs. Different processing units may have different execution models, e.g., as is the case for graphics processing units (GPUs) and central processing units (CPUs).

Depending on the configuration and type of device used, computer-readable media (e.g., memory 204) includes volatile memory (such as random access memory (RAM)) and/or non-volatile memory (such as read-only memory (ROM), flash memory, resistive RAM, etc.). The computer-readable media can also include additional removable storage and/or non-removable storage including, but not limited to, Solid-State Drive (SSD) (e.g., flash memory), Hard Disk Drive (HDD) storage or other type of magnetic storage, optical storage, and/or other storage that can provide non-volatile storage of computer-executable instructions, data structures, program modules, and other data for computing systems.

Computer-readable media can, for example, represent computer memory, which is a form of computer storage media. Computer-readable media includes at least two types of computer-readable media, namely computer storage media and communications media. Computer storage media includes volatile and non-volatile, removable and non-removable media implemented in any process or technology for storage of information such as computer-executable instructions, data structures, programming modules, or other data. Computer storage media includes, but is not limited to, phase change memory (PCM), resistive RAM, static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that can be used to store information for access and retrieval by a computing device. In contrast, communication media can embody computer-executable instructions, data structures, program modules, or other data in a modulated data signal, such as a carrier wave, or other transmission mechanism. As defined herein, computer storage media does not include communication media.

EXAMPLE CLAUSES

Example A, a system to verify trust in an object, the system comprising: one or more processors: memory storing instructions that, when executed by the one or more processors, cause the system to perform operations comprising: receiving a signature associated with the object; decoding the signature to determine a hash of the object; determining that the signature associated with the object is no longer valid due to an invalidity event; using the hash of the object to determine a new signature associated with the object; and verifying, based at least in part on the new signature, that the object is a trusted object.

Example B, the system of Example A, wherein the invalidity event comprises an expiration of a private key used by a signing entity to create the signature.

Example C, the system of Example A, wherein the invalidity event comprises a determination that a length of a key used to create the signature is less than a threshold key length.

Example D, the system of Example A, wherein the invalidity event comprises a determination that a hash algorithm used to create the signature is weak, broken, or compromised.

Example E, the system of Example A, wherein the invalidity event comprises a determination that a signing entity that participates in creation of the signature is no longer a trusted signing entity.

Example F, the system of any one of Examples A through E, wherein the determining the new signature associated with the object comprises searching one or more local or remote signature databases to discover the new signature or a new signature attribute for the new signature.

Example G, the system of any one of Examples A through E, wherein the determining the new signature associated with the object comprises: sending, to a trusted signature producing service, a request to create the new signature, the request comprising the hash of the object; and receiving the new signature from the trusted signature producing service.

Example H, the system of any one of Examples A through G, wherein the object comprises one of an executable file, a certificate, or user credentials.

Example I, the system of any one of Examples A through H, wherein the operations further comprise storing the new signature in association with the object for future trust verification processes associated with the object.

Example J, a system to verify trust in an object, the system comprising: one or more processors; memory storing instructions that, when executed by the one or more processors, cause the system to perform operations comprising: decoding a signature associated with an object to determine individual signature attributes of the signature; determining that the signature associated with the object is no longer valid due to an invalidity event which indicates that a first signature attribute of the signature is invalid and can no longer be relied upon for trust verification; using a second signature attribute that is valid to determine a new signature attribute that can be used instead of the first signature attribute; and verifying, using the new signature attribute, that the object is a trusted object.

Example K, the system of Example J, wherein the first signature attribute comprises a private key and the invalidity event comprises an expiration of the private key.

Example L, the system of Example J, wherein the first signature attribute comprises a key and the invalidity event comprises a determination that a length of the key is less than a threshold key length.

Example M, the system of Example J, wherein the system is notified of the invalidity event by an external system and the first signature attribute comprises a hash algorithm, the invalidity event comprising a determination that the hash algorithm used to create the signature is weak, broken, or compromised.

Example N, the system of Example J, wherein the system is notified of the invalidity event by an external system and the first signature attribute comprises a signing entity, the invalidity event comprising a determination that the signing entity that participates in creation of the signature is no longer a trusted signing entity.

Example O, the system of any one of Examples J through N, wherein the determining the new signature attribute comprises searching one or more local or remote signature databases to discover the new signature attribute.

Example P, a method comprising: receiving, by an entity tasked with verifying trust in an object, a request to verify a signature associated with the object; decoding the signature associated with the object to determine individual signature attributes of the signature; determining that the signature associated with the object is no longer valid due to an invalidity event which indicates that a first signature attribute of the signature is invalid and can no longer be relied upon for trust verification; using a second signature attribute that is valid to determine a new signature attribute that can be used instead of the first signature attribute; and verifying, using the new signature attribute, that the object is a trusted object.

Example Q, the method of Example P, wherein the first signature attribute comprises a private key and the invalidity event comprises an expiration of the private key.

Example R, the method of Example P, wherein the first signature attribute comprises a key and the invalidity event comprises a determination that a length of the key is less than a threshold key length.

Example S, the method of Example P, wherein the first signature attribute comprises a certificate authority that participates in creation of the signature, the invalidity event comprising a determination that the certificate authority that participates in the creation of the signature is no longer a trusted certificate authority.

Example T, the method of any one of Example P through S, wherein the determining the new signature attribute comprises searching one or more local or remote signature databases to discover the new signature attribute.

CONCLUSION

Although the techniques have been described in language specific to structural features and/or methodological acts, it is to be understood that the appended claims are not necessarily limited to the features or acts described. Rather, the features and acts are described as example implementations.

All of the methods and processes described above may be embodied in, and fully automated via, software code modules executed by one or more general purpose computers or processors. The code modules may be stored in any type of computer-readable storage medium or other computer storage devices. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are within the scope of this disclosure and protected by the following claims.

What is claimed is:

1. A system to verify trust in an object, the system comprising:
   one or more processors:
   memory storing instructions that, when executed by the one or more processors, cause the system to perform operations comprising:
      receiving a request to verify a signature associated with the object, wherein the request is received from an entity that creates at least one of the object or the signature associated with the object;
      decoding the signature associated with the object to determine individual signature attributes of the signature;
      determining that the signature associated with the object is no longer valid due to an invalidity event which indicates that a first signature attribute of the signature is invalid and is no longer reliable for trust verification;
      identifying a second signature attribute of the signature that is still valid;
      using the second signature attribute that is still valid to search one or more trusted signature databases to discover a new signature attribute that can be used instead of the first signature attribute; and
      verifying, using the new signature attribute, that the object is a trusted object.

2. The system of claim 1, wherein the object comprises one of an executable file, a certificate, or user credentials.

3. The system of claim 1, wherein the operations further comprise storing the new signature attribute in association with the object for future trust verification processes associated with the object.

4. The system of claim 1, wherein the first signature attribute comprises a private key and the invalidity event comprises an expiration of the private key.

5. The system of claim 1, wherein the first signature attribute comprises a key and the invalidity event comprises a determination that a length of the key is less than a threshold key length.

6. The system of claim 5, wherein the new signature attribute comprises a new key that satisfies the threshold key length.

7. The system of claim 1, wherein:
   the first signature attribute comprises a first hash algorithm;
   the second signature attribute comprises a second hash algorithm; and
   the invalidity event comprising a determination that the first hash algorithm used to create the signature is weak, broken, or compromised.

8. The system of claim 1, wherein the system is notified of the invalidity event by an external system and the first signature attribute comprises a signing entity, the invalidity event comprising a determination that the signing entity that participates in creation of the signature is no longer a trusted signing entity.

9. A method comprising:
   receiving, by an entity tasked with verifying trust in an object, a request to verify a signature associated with the object, wherein the request is received from an entity that creates at least one of the object or the signature associated with the object;
   decoding the signature associated with the object to determine individual signature attributes of the signature;
   determining that the signature associated with the object is no longer valid due to an invalidity event which indicates that a first signature attribute of the signature is invalid and is no longer reliable for trust verification;
   identifying a second signature attribute of the signature that is still valid;
   using the second signature attribute that is still valid to search one or more trusted signature databases to discover a new signature attribute that can be used instead of the first signature attribute; and
   verifying, using the new signature attribute, that the object is a trusted object.

10. The method of claim 9, wherein the first signature attribute comprises a private key and the invalidity event comprises an expiration of the private key.

11. The method of claim 9, wherein the first signature attribute comprises a key and the invalidity event comprises a determination that a length of the key is less than a threshold key length.

12. The method of claim 11, wherein the new signature attribute comprises a new key that satisfies the threshold key length.

13. The method of claim 9, wherein the first signature attribute comprises a certificate authority that participates in creation of the signature, the invalidity event comprising a determination that the certificate authority that participates in the creation of the signature is no longer a trusted certificate authority.

14. The method of claim 13, wherein the new signature attribute comprises a new trusted signing entity.

15. The method of claim 9, wherein:
   the first signature attribute comprises a first hash algorithm;
   the second signature attribute comprises a second hash algorithm; and
   the invalidity event comprising a determination that the first hash algorithm used to create the signature is weak, broken, or compromised.

16. The method of claim 9, wherein the object comprises one of an executable file, a certificate, or user credentials.

17. The method of claim 9, further comprising storing the new signature attribute in association with the object for future trust verification processes associated with the object.

* * * * *